(12) United States Patent
Hansen

(10) Patent No.: US 8,775,603 B2
(45) Date of Patent: Jul. 8, 2014

(54) METHOD AND SYSTEM FOR TESTING VARIATIONS OF WEBSITE CONTENT

(75) Inventor: Eric J. Hansen, Boston, MA (US)

(73) Assignee: SiteSpect, Inc., Boston, MA (US)

( * ) Notice: Subject to any disclaimer, the term of this patent is extended or adjusted under 35 U.S.C. 154(b) by 358 days.

(21) Appl. No.: 11/744,809

(22) Filed: May 4, 2007

(65) Prior Publication Data

US 2008/0275980 A1 Nov. 6, 2008

(51) Int. Cl.
G06F 15/173 (2006.01)
H04L 29/08 (2006.01)
G06Q 30/02 (2012.01)

(52) U.S. Cl.
CPC ............ *H04L 67/2819* (2013.01); *H04L 67/28* (2013.01); *H04L 67/22* (2013.01); *H04L 67/02* (2013.01); *G06Q 30/02* (2013.01)
USPC ........... 709/224; 709/219; 709/217; 709/228; 705/10; 705/4; 714/47.1

(58) Field of Classification Search
USPC ............... 709/224, 219, 217, 228; 705/10, 4; 714/47
See application file for complete search history.

(56) References Cited

U.S. PATENT DOCUMENTS

| | | | |
|---|---|---|---|
| 5,968,125 A | 10/1999 | Garrick | |
| 6,094,677 A | 7/2000 | Capek | |
| 6,360,235 B1 | 3/2002 | Tilt | |
| 6,385,590 B1 | 5/2002 | Levine | |
| 6,477,575 B1 | 11/2002 | Koeppel | |
| 6,549,944 B1 * | 4/2003 | Weinberg et al. | 709/224 |
| 6,658,462 B1 | 12/2003 | Dutta | |
| 6,662,215 B1 | 12/2003 | Moskowitz | |
| 6,912,573 B2 | 6/2005 | Ohkado | |

(Continued)

FOREIGN PATENT DOCUMENTS

| | | |
|---|---|---|
| WO | 0116841 A2 | 3/2001 |
| WO | 0177909 A2 | 10/2001 |
| WO | 0208903 A2 | 1/2002 |
| WO | 2006137692 A1 | 12/2006 |

OTHER PUBLICATIONS

Clickstream Technologies, Datasherpa, product brochure, Jan. 2007, retrieved from www.clickstream.com/datasherpa.htm, Clickstream Technologies Plc, London, England.

(Continued)

*Primary Examiner* — Thuong Nguyen
(74) *Attorney, Agent, or Firm* — Clock Tower Law Group; Erik J. Heels; Michael A. Bartley

(57) ABSTRACT

The invention is a method and system for testing variations of website content useful to optimize website visitor conversions. The invention helps website operators create content variations, and then scientifically test and measure the impact of those variations on conversion rates. The invention includes a method of using a reverse proxy server to introduce page variations on existing website content without needing to modify the existing web server. Using the reverse proxy server, the invention automatically injects values, associated with website variations, into web page tags used with web analytics platforms. The invention makes it possible to test any number of website variations and access such data from within web analytics platforms. The invention also provides a method to automatically transform web page tags of a first web analytics platform to web page tags of a second web analytics platform to easily try new third party web analytics solutions.

19 Claims, 4 Drawing Sheets

(56) References Cited

U.S. PATENT DOCUMENTS

| | | |
|---|---|---|
| 6,938,212 B2 | 8/2005 | Nakamura |
| 6,965,939 B2 | 11/2005 | Cuomo |
| 6,993,476 B1 | 1/2006 | Dutta |
| 7,024,477 B2 | 4/2006 | Allan |
| 7,203,684 B2 | 4/2007 | Carobus |
| 2002/0042738 A1 | 4/2002 | Srinivasan |
| 2002/0083154 A1 | 6/2002 | Auffray |
| 2002/0087660 A1 | 7/2002 | Martin |
| 2002/0099818 A1 | 7/2002 | Russell |
| 2002/0107735 A1 | 8/2002 | Henkin |
| 2003/0014304 A1 | 1/2003 | Calvert |
| 2003/0018501 A1 | 1/2003 | Shan |
| 2003/0131052 A1* | 7/2003 | Allan ............................. 709/203 |
| 2003/0144898 A1 | 7/2003 | Bibelnieks |
| 2003/0195793 A1 | 10/2003 | Jain |
| 2003/0217169 A1 | 11/2003 | James |
| 2004/0030597 A1 | 2/2004 | Bibas |
| 2004/0049417 A1 | 3/2004 | Nickerson |
| 2004/0078431 A1 | 4/2004 | Ahn |
| 2004/0088212 A1 | 5/2004 | Hill |
| 2004/0117239 A1 | 6/2004 | Mittal |
| 2004/0123247 A1 | 6/2004 | Wachen |
| 2004/0167749 A1* | 8/2004 | Friedman et al. ............. 702/186 |
| 2004/0168190 A1 | 8/2004 | Saari |
| 2004/0177318 A1 | 9/2004 | Raja |
| 2004/0216042 A1 | 10/2004 | Consolatti |
| 2004/0258089 A1 | 12/2004 | Derechin |
| 2005/0044185 A1 | 2/2005 | Hind |
| 2005/0154886 A1 | 7/2005 | Birk |
| 2005/0177401 A1* | 8/2005 | Koeppel et al. .................. 705/4 |
| 2006/0031404 A1* | 2/2006 | Kassab ........................ 709/218 |
| 2006/0031442 A1 | 2/2006 | Ashley |
| 2006/0155751 A1 | 7/2006 | Geshwind |
| 2006/0200503 A1 | 9/2006 | Dosa |
| 2006/0200556 A1 | 9/2006 | Brave |
| 2006/0230430 A1 | 10/2006 | Hondo |
| 2006/0248189 A1 | 11/2006 | Jerrard |
| 2006/0271671 A1* | 11/2006 | Hansen ........................ 709/224 |
| 2007/0050476 A1 | 3/2007 | Etgen |
| 2007/0055930 A1 | 3/2007 | Jerrard |
| 2007/0061282 A1 | 3/2007 | Ganguly |
| 2007/0078810 A1 | 4/2007 | Hackworth |
| 2007/0079233 A1 | 4/2007 | Hayler |
| 2008/0184116 A1* | 7/2008 | Error ............................ 715/704 |

OTHER PUBLICATIONS

IBM, Coremetrics. WebSphere Commerce Information Center, pages from help manual, Feb. 15, 2007, http://publib.boulder.ibm.com/infocenter/wchelp/v5r6/index.jsp, IBM, Armonk, NY, USA.

* cited by examiner

METHOD AND SYSTEM FOR TESTING VARIATIONS OF WEBSITE CONTENT

CROSS-REFERENCE TO RELATED APPLICATIONS

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2007 SiteSpect, Inc.

BACKGROUND OF THE INVENTION

1. Field of the Invention

The invention relates generally to online marketing, advertising, and web functionality. The invention relates more specifically to conversion marketing, website testing, and web analytics.

2. Background

Website operators are challenged to maximize conversion rates—the number of visitors who make a purchase, register for a new account, sign up for a newsletter, submit a sales lead, adopt a website feature, etc. A website's conversion rate is a measure of how successfully a website persuades visitors to act on what is offered.

The conversion process is normally comprised of numerous pages and links. The content on each page (including the text headings of each link) must compel the visitor forward through the site. While a few visitors quickly move forward through a site, the majority of visitors never click to a second page. Of the few that do click to a second page, only a small percent follow through with any conversion action.

To optimize web conversions, the website operator must determine how best to speak to the site's visitors, in a way that visitors understand, telling visitors what they need to know at each point in the conversion process. Specifically, the website operator needs to test variations of website content (including, but not limited to, product descriptions, headlines, calls to action, assurance messages, images, and words that aid site navigation and usability) and determine which are most persuasive to visitors.

Conversion marketing is the science of measuring, testing, and improving the rate at which website visitors respond to website content with a predefined action or actions, including, but not limited to, clicking a link, filling out a web page form, putting an item in a shopping basket, subscribing to a newsletter, spending time consuming specific content, or purchasing a product. More background on conversion marketing and website content testing is found in applicant's US Patent Application Publication Number 2006/0271671, filed Nov. 30, 2006, titled "System And Method For Optimizing Website Visitor Actions," which is herein incorporated by reference.

Web analytics relates to measuring and analyzing the actions and behavior of visitors to a website. Web analytics primarily focuses on business aspects of a visitor's actions such as clicking on advertising links, making purchases, consuming content, and requesting information. Web analytics platforms are software programs or web services for managing, tracking, and reporting data associated with visitor actions. There are many different actions and data that web analytics platforms can track and report. Such data or actions may include: requests for page views, requests for files on a web server a series of requests from a single visitor, whether visitors are new or repeat visitors, advertisement impressions, and bounce rates,

DESCRIPTION OF PRIOR ART

There have been several attempts at optimizing web conversions using variation testing. One model for such testing is a remote content server model, which may be operated either by a third party vendor or by the site operator itself. In such a model, a request from a visitor's web browser is sent directly to a website. The website responds with customized content that includes JavaScript code. The JavaScript code subsequently contacts a remote server of the optimization tool vendor. The web browser executes the JavaScript and requests variable web page content from a remote server. Then the remote server processes the web browser's JavaScript request, sending the web browser content variations and tracking the visitor's session, typically using a cookie. The web browser inserts the content variations into the web page to complete rendering.

While the remote content server model provides a relatively simple way to introduce variations into multiple regions on the same page, the model suffers from a number of disadvantages:

1) The website operator must modify a web server's website pages to include the JavaScript code.

2) The web browser must have JavaScript enabled.

3) The web browser may have to make multiple HTTP connections to the remote server, which slows overall page load time.

4) This model cannot track or modify non-HTML content, such as ".TXT," ".XML," ".EXE," or ".PDF" files since JavaScript is not executed for those document types.

5) Since the page is not fully rendered until processed by the end-user's browser, the content that the user sees cannot be recorded for auditing or analysis purposes (which is done by products such as Tealeaf so that the operator's technical staff can investigate problems reported by end users).

6) The model can typically only insert static content into a page (whether the encompassing page itself is statically or dynamically generated). This prevents testing variations of the dynamic content itself, such as the formatting of a catalog page or search engine results.

Another model for testing variations is a remote redirection server model. In this model, a visitor clicks on a static link (HREF) for a website, and the web browser makes a request to a redirect server or redirect page. The redirect server responds with an HTTP "Location" redirect to a link on the target website. The redirect server also tracks a visitor's session, typically using a cookie. The web browser accepts the redirect and automatically requests a new URL from the website. The website then responds with content variations.

The remote redirection server model improves on the remote content server model in that it does not require JavaScript in the web browser. Although the remote redirection server model is able to track clicks and provide variations of any type of content, the model suffers from a number of disadvantages:

1) A website operator must physically create new variations of pages, and must re-code links wherever the resulting page may require a variation.

2) The web browser has to make two requests for a test page (one to the redirect server, and a second for the redirect to the website), which slows overall page load time.

3) Page content cannot be dynamically altered by the testing product.

4) Links may display the URL of the redirect server instead of that of the website.

5) The web browser may display a warning when redirecting from HTTPS to HTTP sites (or vice versa).

Another model for testing variations is an integrated module model. In this model, a visitor's web browser requests content directly from a target website. The target website server is integrated with a marketing optimization module so that the visitor's request is handled within the same system. The integrated marketing module instructs the website how to render content, track actions, and so forth. The website server returns content variations directly to the web browser.

The integrated model uses the website platform's own session management facility and thus can avoid using additional cookies and JavaScript. By integrating the marketing module with the website platform, there are relatively fewer time delays, more content variation options within the same page, and the model can track clicks and provide variations of any type of content. The integrated model, however, suffers from a number of drawbacks:

1) Installing an integrated model is complex, expensive, and time consuming to the website operator.

2) The website operator must reconfigure the website architecture to be compatible with the marketing vendor's integrated module.

3) The integrated module cannot manage marketing tests that span heterogeneous servers. For example, if a website operator runs a vendor's integrated module on a first subdomain (e.g. www1.example.com), but not on a second subdomain of the website (e.g. www2.example.com), then only the first subdomain can use the marketing test module, even though the two systems may host the website jointly.

There are also a number of patents and patent applications that attempt to optimize web conversions.

U.S. Patent Application Publication Number 2006/0200556 "Method And Apparatus For Identifying, Extracting, Capturing, And Leveraging Expertise And Knowledge" (Brave, Sep. 7, 2006) discloses a method to determine knowledge within a community of users. The objective is to improve content searches, but does not measure or optimize user behavior from the perspective of the site operator.

U.S. Patent Application Publication Number 2002/0099818 "Method And System For Monitoring The Performance Of A Distributed Application" (Russell, Jul. 25, 2002) discloses a method of determining one or more performance metrics for a distributed application. The objective of Russell is to measure and track system/network level performance metrics such as pageload latency/time/speed, javascript errors on the page, etc. Russell discloses inserting tags to accomplish performance metrics monitoring. Russell addresses how well the end user's computer/browser is able to communicate with a web server.

U.S. Patent Application Publication Number 2006/0200503 "Modifying Back-End Web Server Documents At An intermediary Server Using Directives." (Dosa, Sep. 7, 2006) discloses a method of providing network services by a network coupled back-end server that is accessed by an intermediary server such as a reverse proxy server. Dosa provides a solution to allow cell phones to access external data source when responding to a Web service request.

U.S. Patent Application Publication Number 2004/0177318 "Identifying Statements Requiring Additional Processing When Forwarding A Web Page Description," (Raja, Sep. 9, 2004) discloses a system to enable an administrator to conveniently specify statements of a web page description which may require additional processing. When statements of web page descriptions potentially require additional processing, a reverse proxy server is used to compare statements of web page descriptions with rules to determine if additional processing is needed.

U.S. Pat. No. 5,968,125 "Process For Optimizing The Effectiveness Of A Hypertext Element" (Garrick et al. Oct. 19, 1999) discloses a process for determining the effectiveness of a web page to a visitor by creating alternative and test web pages, sending requests to the test web page, and monitoring the use of the web page and the rate that the web page objective was met and replacing pages with the page most visited.

U.S. Patent Application Publication Number 20020042738 "Method And Apparatus For Determining The Effectiveness Of Internet Advertising" (Srinivasan et al. Apr. 11, 2002) discloses a method and system for measuring the effectiveness of the layout or appearance of a website advertisement to a visitor wherein different visitors are shown different formats of the same page and response to the page is monitored and statistics are analyzed regarding the responses.

U.S. Patent Application Publication Number 20030014304 "Method Of Analyzing Internet Advertising Effects" (Calvert et al. Jan. 16, 2003) discloses a method of evaluating Internet advertisement effectiveness that involves collecting Internet activity information associated with a multitude of cookies.

U.S. Patent Application Publication Number 20030018501 "Adaptive Testing For Conversion-Related Estimates Relevant To A Network Accessible Site" (Shan Jan. 23, 2003) discloses a method and system for processing test data relevant to specific behavior of visitors of a website.

U.S. Pat. No. 6,662,215 "System And Method For Content Optimization" (Moskowitz et al. Dec. 9, 2003) discloses a system and method for determining appropriate website content for consumers comprising a server arrangement, including a "real time content optimization" server, a user computer, and a network, wherein upon request a web page is generated for the user having static and dynamic elements which are tested for user reaction and response.

U.S. Patent Application Publication Number 20040030597 "Method And System Of Optimizing The Response And Profitability Of A Marketing Program" (Bibas Feb. 12, 2004) discloses a method and system for tracking a consumer's behavior on a website, dynamically changing an advertisement or sales page, and testing a sales page to a subset of the marketing program to optimize the content of the page.

U.S. Patent Application Publication Number 20040123247 "Method and apparatus for dynamically altering electronic content" (Wachen, Mark et at. Jun. 24, 2004) discloses "[a] method and apparatus for altering electronic content includes a template for assigning variables and values to a section of the content, a generator that creates the permutations of the content, a transmitter that provides the content to a requestor and a evaluator and optimizer that aids in selecting the most optimal permutation of the content."

While the prior art discloses attempts to improve online marketing, none of the web conversion optimization models provides a method of introducing page variations on existing website content without needing to make modifications to existing, back-end, content on the web server. What is needed, therefore is 1) a product that does not require modifications to an existing web server, 2) a product that automatically makes website content variations, 3) a product that can introduce variations on both static and dynamic website content, and 4) a website testing product that can be integrated with existing third-party web analytics platforms.

BRIEF SUMMARY OF THE INVENTION

The invention is a web software product that helps website operators create content variations, scientifically test and measure the impact that those content variations have on visitor conversion actions, and integrate data from content variations with web analytics platforms. The invention makes it possible to test any number of website variations—in any combination—on website visitors. The invention produces conclusive answers about the impact of any type of content change on visitor conversion rates. Website operators learn, for example, which product descriptions yield the most sales, which promotional language pulls the most sales leads, and what site registration form generates the most sign-ups.

The invention provides a method of using a reverse proxy server to introduce page variations on existing website content, without the need to make any modification to existing (back-end) content on the web server or target web server. The web server hosts a website to be tested and evaluated. The reverse proxy server delivers web content variations to visitors. A visitor's web browser—or any electronic device or program capable of accessing web content—requests website content located at the web server. A reverse proxy server receives this request for website content. The reverse proxy server retrieves website content from the web server. The web server sends unmodified content to the reverse proxy server. The reverse proxy server modifies website content and transmits the modified content to a requester, such as a visitor or a browser. The reverse proxy server tracks a visitor's actions (actions including responses, non-responses, conversions, non-conversions, etc.).

The invention integrates test campaign data with web analytics platforms including third-party web analytics platforms (e.g. such as those provide by Google Analytics, WebSideStory, Omniture, Coremetrics, etc.). The invention feeds or supplies test campaign data to web analytic platforms by injecting values into web page tags, page forms, URL's and links, or cookie values. Web page tagging is a method of collecting web analytics data by using executable scripts on each web page to notify a third-party server when a page is rendered by a web browser. For example, if a site uses WebSideStory HBX for web analytics, then that site will have existing JavaScript tags on each web page. The invention will then insert its own data values into the tags' custom variables so that the results of multivariate comparison tests may be tracked and analyzed within the WebSideStory HBX reporting system.

The invention alternately inserts new third-party JavaScript tags onto a page where they do not already exist. This provides a turnkey mechanism for implementing third party web analytics solutions. Instead of the prior art approach of having to modify an underlying site to implement page tagging, the invention automatically inserts such tags into web pages. The invention can conditionally insert different tags (or tag values) based on parameters such as URL, domain name, whether or not specific content exists on the page, and so on.

The invention alternately transforms third-party web page tags. The invention alters or morphs an existing third-party vendor's analytics tag into that of yet another vendor. This is useful in situations where a website operator wishes to try a new web analytics provider and/or migrate away from an existing provider. The invention looks for an existing JavaScript tag, parses out page-specific values, then replaces the tag—or appends a new tag—with the parsed page-specific values. The benefit is that the site operator is no longer locked into an existing analytics solutions due to the effort required to remove the old tags and add the new tags and the potential data tracking/collection loss during the interim period where there are no tags on the site. Site operators are now free to try new vendors and migrate their third-party analytics solutions using the invention as the enabler.

In one embodiment, the method of testing variations of website content includes receiving a request at a reverse proxy server for website content located at a web server, that is the website content is located at the web server. The website content can be any static or dynamic content in various formats (text, images, animations, audio, etc.). The web server is the target of the request and is where website content is located. The reverse proxy server sits in front of the web server. That is, connections coming from the Internet addressed to the web server are routed through the reverse proxy server. The reverse proxy server retrieves requested website content from the web server. This website content contains a web page tag associated with a web analytics platform. The web page can use any scripting language, but preferably uses JavaScript. The reverse proxy server, or a module on the reverse proxy server, modifies website content by introducing variations in the website content. At the reverse proxy server, the invention also inserts values, associated with website content variations for testing, into the web page tag. By inserting website testing variation data into page tags, data from website content variations is accessible within a reporting system of a web analytics platform, including third-party platforms. The modified website content, having web pages tags linked to variation data, is transmitted to a requester which is a website visitor, a browser, crawler program, or the like.

In another embodiment, the invention creates new web page analytics tags at the reverse proxy server and inserts these created tags into modified website content. This is for situations where a website to be tested contains no web page tagging linked to web analytics platforms. The web page analytics tags that the invention creates and inserts are designed for, or formatted for, tracking with web analytics reporting systems.

In another embodiment, at the reverse proxy server, the invention transforms or modifies existing web page tagging designed for use at a first web analytics platform so that modified website content contains web page tagging formatted for tracking at a second web analytics platform. The invention alternately replaces an existing tag, or appends a new tag.

The reverse proxy server may track a visitor's session with its own cookie, the web server's cookie, a third-party web analytics system's cookie, using the web server's URL/path translation to piggyback on the web server's session management facilities, using a hidden form field, or by any other method of session management. The system may also keep a visitor's session through the reverse proxy servers session management facilities, independent of the web server. The system on the reverse proxy server evaluates requests and responses and tracks a visitors actions. The modification module modifies content to introduce variations as required, and responds to the web browser with final content.

The web server website operator creates test campaigns to measure the impact of variations of copy, headlines, positioning, layout, imagery, price, etc. The modification module includes a user interface for allowing the website operator to create site variations using a WYSIWYG (what-you-see-is-what-you-get) visual editor. This eliminates the need to modify the web server content and saves time and cost otherwise spent on web designers and programmers. The operator can also target optimization efforts by segmenting visitors by specific criteria. The operator can stipulate that one or more visitor segments are assigned or not assigned to a test group based on operator-controlled parameters, assignment criteria, and test campaign parameters.

The testing is then automated through the reverse proxy server system. Testing includes use of A/B testing, split path (i.e., split run) testing, and multivariate testing. During the test campaign, the modification module collects data for each response point (action) that the website operator desires to measure. Some measurable actions include: adding an item to a shopping cart, registering for an account, and completing a sale.

At any time during a test campaign, the website operator can run a report to see how variations are impacting visitor conversions. The report is customizable and can show how visitors responded during a visit as well as across repeated visits to show if a variation affected the likelihood of a conversion on a return visit. Reports can include charts and graphs with statistical summaries supporting the results. The modification module provides the ability to track, correlate, and measure visitor actions on a web server to one or more test groups.

Features and Advantages

One advantage of the invention is that when integrating with web analytics platforms, the invention saves the time and effort that would otherwise be required to manually insert or modify the tags across pages and templates.

Another advantage is that website operators can try new third-party web analytics platforms without manually modifying all web page tags on a given website.

A feature of the invention is that there is no need to modify the web server. Website operators can create site variations using a WYSIWYG editor. The advantage of a visual editor is saving time and cost otherwise spent on web designers and programmers.

Another feature of the invention is that the website operator can segment visitors by specific criteria. The advantage of criteria-based segmentation is being able to target optimization efforts to the highest value market segment(s). The invention enables segmenting with several types of criteria, including historical visitor data stored within the invention as well as that provided by the web operator's external CRM/SFA (Customer Relationship Management/Sales Force Automation) system.

Another feature of the invention is that variations can be created for both statically and dynamically created content. Variations are created using a search and replace technique involving "regular expressions." Use of regular expressions enables more complex variations to be introduced, particularly on dynamically-generated content.

Another feature of the invention is multivariate/matrix testing. This method of testing achieves higher response rates in less time than A/B testing, by testing any number of variations for any number of factors anywhere on the web server, alone or in combination.

Another feature of the invention is that it can provide built-in reports. The advantage of reports, with accompanying charts and graphs, is that it gives web operators conclusive answers, with statistical summaries to support the results.

Another feature of the invention is sophisticated test campaign scheduling. The modification module lets a website operator run test campaigns individually or concurrently. Also, test campaigns can be scheduled in advance, and run on an automated basis where the tests stop once certain conditions have been met.

Another feature of the invention is reusable test campaign elements. Website operators save time by creating new test campaigns using elements from previous test campaigns. The modification module's library stores previous variations, response points, and assignment test criteria for subsequent use.

Another feature of the invention is the ability to track and analyze visitor actions. The system can track not only individual actions, but also sequences of actions such as specific click-paths through a shopping visit. The modification module can even track how variations affected actions across visits. The modification module can track requests for HTML content as well as non-HTML content.

Another feature of the invention is the ability to signal to the web server that a current request came from a visitor in a specific test group. This enables website operators to test functional variations in the web server by creating code that can alter its function based on the visitor's test group status.

A feature of the reverse proxy model is that the invention can optionally cache static content, e.g. images, in the reverse proxy server for web acceleration, and can increase speed of network traffic by optionally deflating or compressing content as it is sent back in the HTTP response.

An advantage of the invention is that the website operator does not need to modify website content, or require special programs on the visitor's web browser. The system can track visitor actions with or without cookies.

Another advantage of the invention is that the general system cost is moderate. With no website modification needed, website operators can avoid reconfiguring web server architecture. No needed website modification also means a short campaign set-up time.

Another advantage of the invention is compatibility with all web content. The system works on all sites, static or dynamic content, and even sites spread across multiple hosts.

By combining the proven methods of direct response testing and experimental design, the invention enables website operators to: 1) determine which changes improve conversion rates by testing the changes on a subset of visitors, 2) test unlimited variations using a web-based management system that requires no technical expertise or modifications to the web server, 3) optimize the web server for specific customer groups using visitor segmentation, 4) seamlessly integrate with third-party web analytics platforms for accessing web site variations data.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF THE INVENTION, INCLUDING THE PREFERRED EMBODIMENT

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 1:
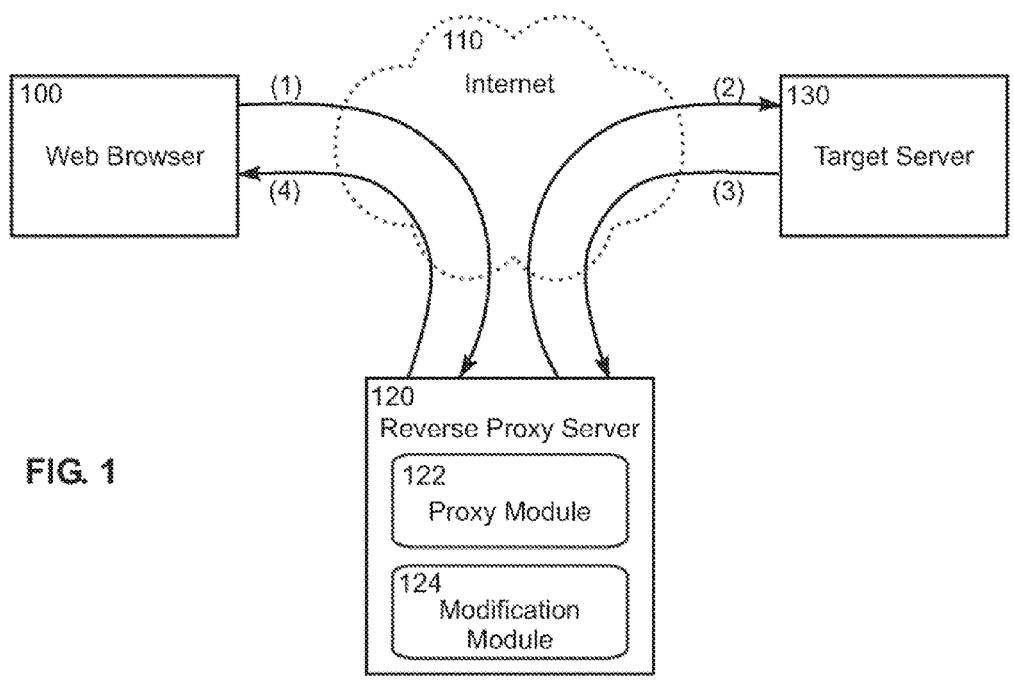
FIG. 1 is an overall system diagram showing the reverse proxy server model.

FIG. 1 is an overall system diagram showing the reverse proxy server model. The model begins after a web page request originates (1) from web browser 100. Instead of sending the request directly to target server 130 (that is the address where a request is originally targeted, or the intended web server of a given request), the request is sent to reverse proxy server 120, over Internet 110, or over some other network. Reverse proxy server 120 includes a proxy module 122 for handling all proxy-related tasks and a modification module 124 for modifying content, tracking visitors actions, collecting data for selected visitor response points, and reporting on how content changes affect conversion rates. Data related to test campaigns, visitors, users, and content variations is stored in one or more databases (not shown), which can be implemented as part of reverse proxy server 120 or elsewhere.

Continuing with FIG. 1, reverse proxy server 120 requests (2) content from target server 130. Target server 130 responds to reverse proxy server 120 by sending (3) unmodified content to reverse proxy server 120. Reverse proxy server 120 tracks a visitor's session using a cookie of reverse proxy server 120 or target server 130. Reverse proxy server 120 may also track the visitor by URL/path translation via a piggyback approach. Reverse proxy server 120 evaluates the request and response and tracks the visitor's actions. Reverse proxy server 120 modifies web content, sent by target server 130, to introduce variations as required. Finally reverse proxy server 120 responds to web browser 100 by sending (4) modified content.

Figure 2:
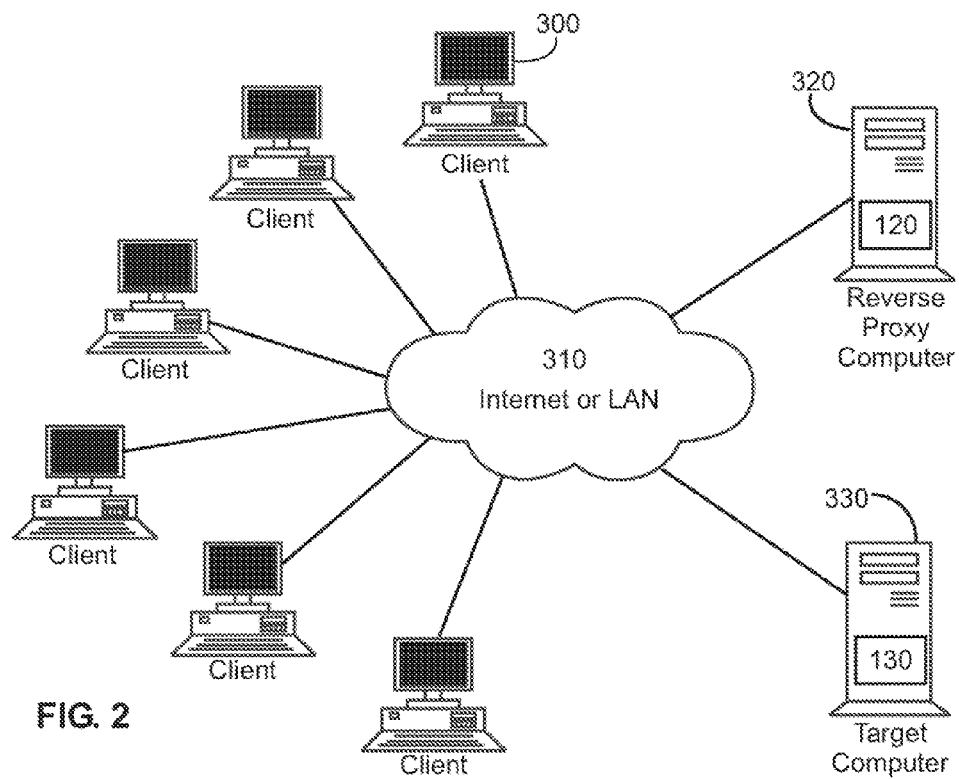
FIG. 2 is a system diagram showing hardware of the reverse proxy server model.

FIG. 2 is a system diagram showing hardware of the reverse proxy server model. FIG. 2 illustrates a plurality of client computers 300 running web browsers 100 (not shown). Reverse proxy computer 320 runs reverse proxy server 120, and target computer 330 runs target server 130. Client computer 300, reverse proxy computer 320, and target computer 330 are interconnected and communicate via network 310, which is the Internet for the Application Service Provider (ASP) model (where the application is hosted on the service provider's computer) or a LAN for the enterprise model (where the application is hosted on the client's computer). It is to be understood that reverse proxy computer 320 and target computer 330 can be one or more physical computers. Reverse proxy computer 320 can be any computer operable to run a database server and a web server.

The system is able to compensate for reverse proxy server 120 failure. If reverse proxy server 120 is down, target server 130 can still be available by deploying a hot backup server (not shown) with an intelligent load balancer. The load balancer transparently redirects traffic to the hot backup. Another option is to deploy edge-routing services to redirect traffic from one connectivity network to another network. For example, the system can be collocated at a data center that has peering with four tier-one Internet backbones (not shown). If a packet that would ordinarily travel through (for example) backbone 1 cannot be transmitted, then the edge-router (not shown) detects this and re-routes the packet, and subsequent packets, through (for example) backbone 2. Another option is to deploy DNS failover, whereby if the DNS server detects that the reverse proxy server is down, then subsequent DNS queries return the IP address of the target computer. When the DNS server detects that the reverse proxy server has returned to normal operation, subsequent DNS queries return the IP address of the reverse proxy server.

The system is also able to compensate for any delay with HTTP requests and responses between reverse proxy server 120 and target server 130 by closely positioning the servers, or placing the servers on the same network in a data center. Caching static content, and deflating and compressing content also compensates for any delays.

When a website operator launches a test campaign, the website operator tells the system, via a user interface (not shown) to the modification module 124 of reverse proxy server 120, exactly which type(s) of visitors to test. For example, if a target server 130 sells to a broad market, then perhaps the operator of target server 130 will simply want a representative sample of all visitors, such as 5% of all visitors over a two week period of time. If a business targets one or more specific market segments, then the system lets the business target efforts precisely. The system provides several types of segmentation criteria, including past visitor history, referrals from search engines or banner ads, entry through specific landing pages, and customer segments defined by the web operator's Customer Relationship Management/Sales Force Automation (CRM/SFA) system. The number and types of the segmentation criteria is adjustable according to the needs of a particular target server.

Generally, the system will vary or modify HTML content, since the majority of web pages appear in this format, but the system is not limited to varying HTML content. The system can vary content for plain text documents, WML documents, CSS documents, and other non-HTML content.

Embodied as a web software product, the invention can be offered as an ASP version (application service provider), offered as an enterprise (installed) version, and other formats. In one embodiment of the invention (ASP model), the software runs as a hosted service on a web server in a third-party data center or facility. For very high traffic sites (enterprise model), a standalone version can be installed in a website operator's own data center. The system is operable to run multiple concurrent test campaigns with the ability to signal a visitor's test status through the use of a cookie or other HTTP header transmitted between the reverse proxy server 120 and target server 130 for functionality testing.

Figure 3:
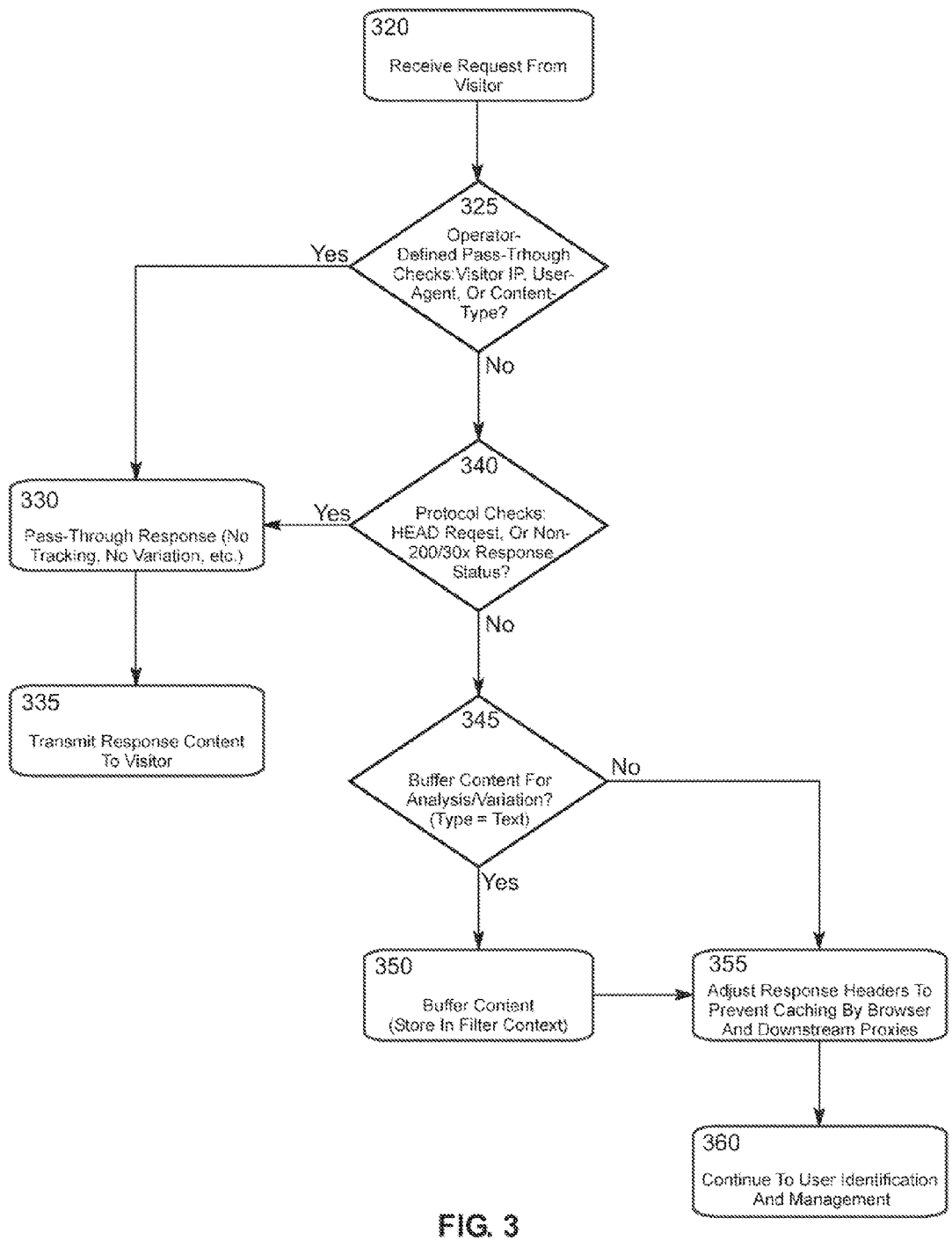
FIG. 3 is a flow chart of entry point response.

FIG. 3 is a flow chart of entry point response. In step 320 the reverse proxy server 120 (not shown) receives an HTTP request from a client computer 300 (not shown). The target website operator decides attributes of the HTTP request that indicate whether or not the request will result in modified or unmodified content being delivered to the client computer 300. In step 335, if the visitor's HTTP request includes attributes (such as IP address, USER-AGENT URI path, or content-type) that the target website operator has not defined for tracking, then the HTTP request will be passed through, resulting, in step 330, in no variation of the target website's content and no tracking of the visitor's request, and then operation proceeds to step 335, where response content is transmitted to the visitor. Otherwise, operation proceeds to step 340. In step 340, additional protocol checks are performed to determine whether tracking and variation should be performed. For example, if the request does not produce an "OK" response code (e.g. HTTP status code number 200) from the target web server, then the request will not be tracked. If the protocol checks of step 340 indicate that no tracking should be done, then operation proceeds to step 330. Otherwise, operation proceeds to step 345. In step 345, the system checks to see if the HTTP request is for text-based content, and, if so, then content is buffered in step 350. If not, operation proceeds to step 355. In step 355, anti-caching is performed (response headers are adjusted) to prevent caching by downstream proxies and browsers. Next, operation proceeds to step 360, user identification and management, which is described in FIG. 4.

Figure 4:
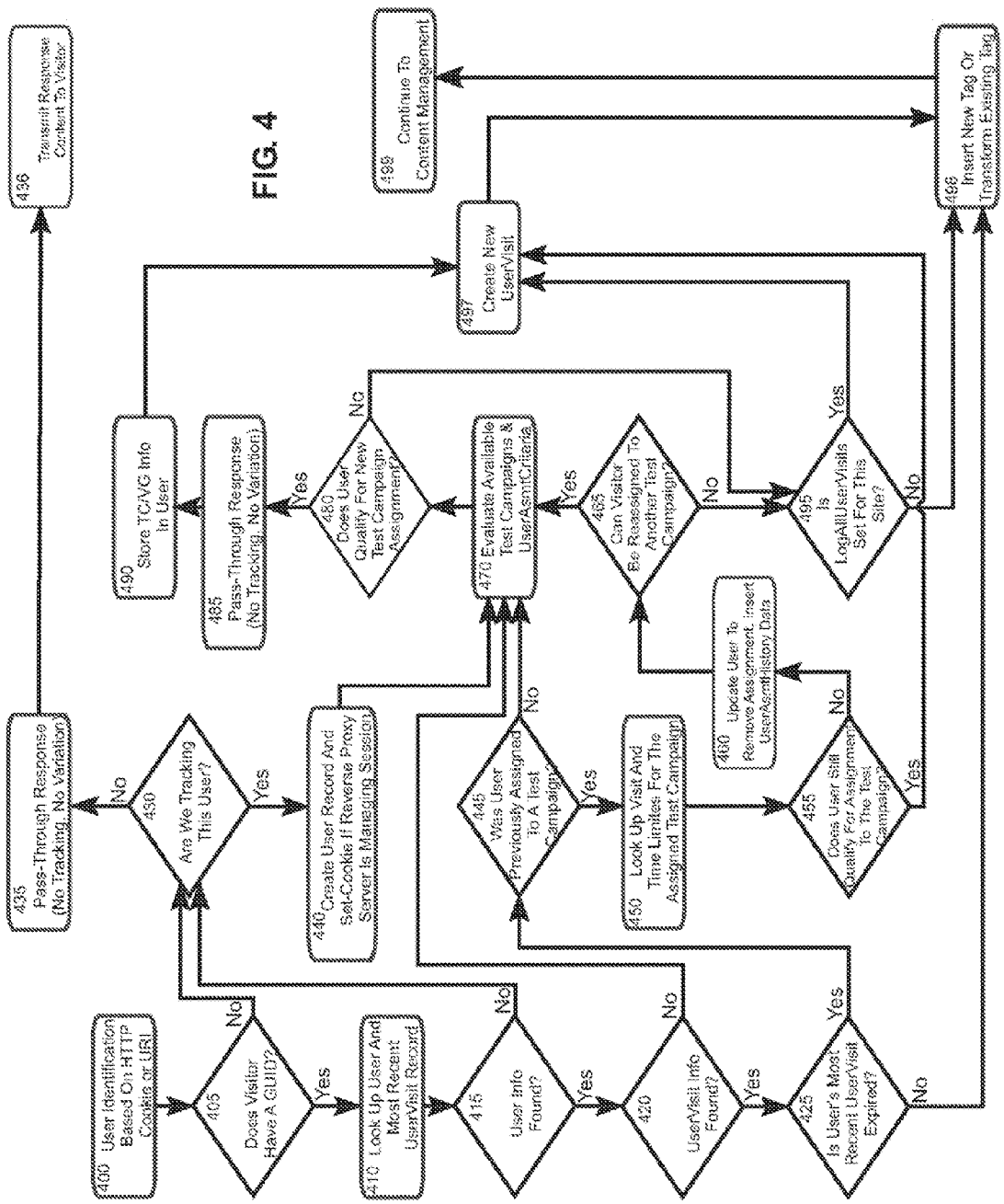
FIG. 4 is a flow chart of user identification and user management.

FIG. 4 is a flow chart of user identification and user management. In step 400, a visitor is identified via cookie data or URI (Uniform Resource Identifier) data contained in the visitor's request. Operation proceeds to step 405, where the system checks to see if the visitor has a Globally Unique Identifier (GUID). If the result of step 405 is no, operation proceeds to step 430, and if the result of step 405 is yes, operation proceeds to step 410. In step 410, the system looks up the user and retrieves the most recent user visit data, and operation proceeds to step 415. In step 415, the system checks to see if user data was found, and if no, then operation proceeds to step 430. If yes, then operation proceeds to step 420. In step 420 the system checks to see if any user visit data was found for the user, and if no, then operation proceeds to step 430. If yes, then operation proceeds to step 425. In step 425, the system checks to see if the user's most recent user visit data has expired, and if yes, then operation proceeds to step 445. If no, then operation proceeds to step 498. A new page tag is either inserted, where a page tag does not exist, or transformed, where there is an existing page tag. The process then continues to content management in step 499.

Continuing with FIG. 4, in step 430, the system checks to see whether the user is being tracked, and if no, then operation proceeds to step 435. In step 435, the system performs a pass-through response, i.e., no variation of the target website's content and no tracking of the visitor's request, and operation proceeds to step 436, where response content is transmitted to the visitor. If the result of step 430 is yes, then operation proceeds to step 440, where the system creates a user record and, if a reverse proxy server is managing session data, then the system also sets a cookie. Then operation proceeds to step 470.

Continuing with FIG. 4, in step 445 the system checks to see if the user was previously assigned to a test campaign, and if no, then operation proceeds to step 470. If yes, operation proceeds to step 450. In step 450, the system looks up visit and time limits for the assigned test campaign, and operation proceeds to step 455. In step 455, the system checks to see whether the user was previously assigned to a test campaign, and if no, then operation proceeds to step 470. If yes, then operation proceeds to step 455. In step 455, the system checks to see whether the user still qualifies for assignment to the test campaign, and if yes, then operation proceeds to step 497. If no, operation proceeds to step 460. In step 460, the system updates user data to remove the current assignment and inserts user assignment history data, and then operation proceeds to step 465. In step 465, the system checks to see whether the visitor can be reassigned to another test campaign, and if yes, then operation proceeds to step 470. If no, then operation proceeds to step 495. In step 495, the system checks to see whether this user visit should be logged, and if yes, then operation proceeds to step 497. If no, then operation proceeds to step 498. A new page tag is either inserted, where a page tag does not exist, or transformed, where there is an existing page tag. Operation, then, proceeds to step 499, continue to content management.

Continuing with FIG. 4, in step 470, the system evaluates the available test campaigns and user assignment criteria. A user can be included or excluded from a given test campaign based on a plurality of operator-defined variables, including, but not limited to, the visitor's and/or request's date/time, the USER AGENT value, IP address, entry URL, current URL, referring URL, visitor history, cookie value, and past visitor actions. Next, operation proceeds to step 480. In step 480, the system checks to see whether the user qualifies for a new test campaign assignment, and if no, then operation proceeds to step 495. If yes, then operation proceeds to step 485. In step 485, the system assigns the user to a test campaign and variation group, and operation proceeds to step 495. In step 490, the system stores the assigned test campaign (TC) and variation group (VG) information in user data, and operation proceeds to step 497.

Continuing with FIG. 4, in step 497, a new user visit is created. In step 498 a new page tag is either inserted, where a page tag does not exist, or transformed, where there is an existing page tag. Operation proceeds to step 499, continue to content management, which is described in FIG. 5.

Figure 5:
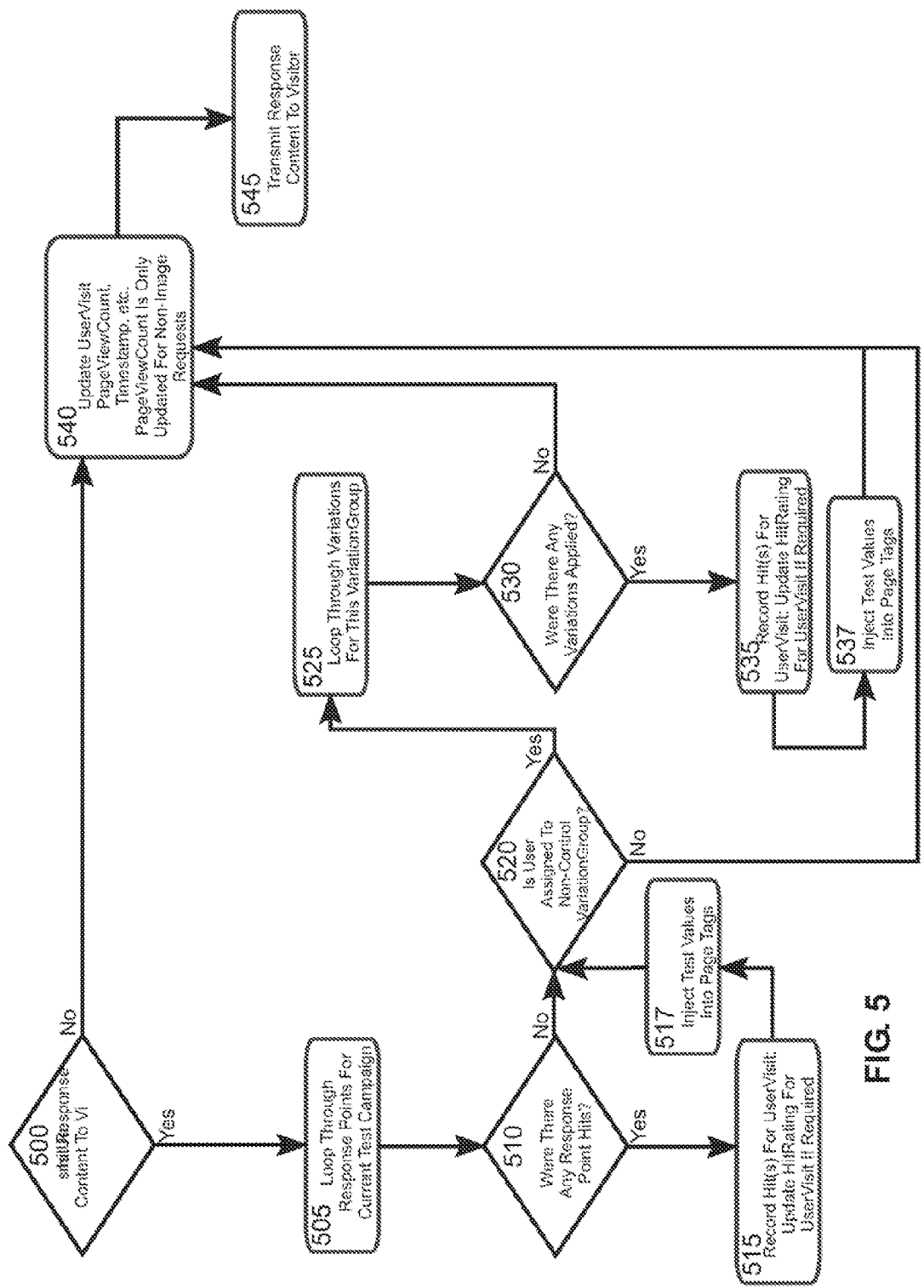
FIG. 5 is a flow chart for content management, including response point analysis and variation transformation.

FIG. 5 is a flow chart for content management, including response point analysis and variation transformation. Operation begins at step 500, where the system checks to see whether a user is assigned to a test campaign, and if no, then operation proceeds to step 540. If yes, operation proceeds to step 505, where the system loops through response points for the current test campaign, and then operation proceeds to step 510. In step 510, the system checks to see whether there were any response point hits, and if no, then operation proceeds to step 520. If yes, then operation proceeds to step 515, where the system records hit(s) for the user visit, dynamically modifies any third-party web analytics tags, URL's, forms or cookies to insert new tracking codes, and, if required, updates the hit rating for the user visit. Operation, then, continues to step 517 where test campaign values are injected into web pages tags. In step 520, the system checks to see whether the user is assigned to a non-control variation group, and if no, then operation proceeds to step 540. If yes, then operation proceeds to step 525, where the system performs variations for the current variation group. Next, operation proceeds to step 520. In step 530, the system checks to see whether any variations were applied, and if no, then operation proceeds to step 540. If yes then operation proceeds to step 535, where the system records hit(s) for the user visit and, if required, updates the hit rating for the user visit. Operation, then, continues to step 537 where test campaign values are injected into web pages tags before proceeding to step 540. In step 540, the system updates data, including user visit data, page view count data (only for non-image requests) and time-stamp data, and then operation proceeds to step 545, where response content is transmitted to the visitor.

The invention preferably integrates test campaign values into JavaScript web page tagging by either inserting values, creating new tags, or transforming tags. Below is an example of a WebSideStory JavaScript web page tag without test campaign data included:

```
<script language="javascript">
var __hbEC=0,__hbE=new Array;function __hbEvent(a,b){b=__hbE[__hbEC++]=new
Object( );b.__N=a;b.__C=0;return b;}
var hbx=__hbEvent("pv");hbx.vpc="HBX0200u";hbx.gn="ehg-
examplewebsite.hitbox.com";
//BEGIN EDITABLE SECTION
//CONFIGURATION VARIABLES
hbx.acct="WATTS000EJH00000";//ACCOUNT NUMBER(S)
hbx.pn="PUT+PAGE+NAME+HERE";//PAGE NAME(S)
hbx.mlc="CONTENT+CATEGORY";//MULTI-LEVEL CONTENT CATEGORY
hbx.pndef="title";//DEFAULT PAGE NAME
hbx.ctdef="full";//DEFAULT CONTENT CATEGORY
//OPTIONAL PAGE VARIABLES
//ACTION SETTINGS
hbx.fv="";//FORM VALIDATION MINIMUM ELEMENTS OR SUBMIT FUNCTION
NAME
hbx.lt="none";//LINK TRACKING
hbx.dlf="n";//DOWNLOAD FILTER
hbx.dft="n";//DOWNLOAD FILE NAMING
hbx.elf="n";//EXIT LINK FILTER
//SEGMENTS AND FUNNELS
hbx.seg="";//VISITOR SEGMENTATION
hbx.fnl="";//FUNNELS
//CAMPAIGNS
hbx.cmp="";//CAMPAIGN ID
hbx.cmpn="";//CAMPAIGN ID IN QUERY
hbx.dcmp="";//DYNAMIC CAMPAIGN ID
hbx.dcmpn="";//DYNAMIC CAMPAIGN ID IN QUERY
hbx.dcmpe="";//DYNAMIC CAMPAIGN EXPIRATION
hbx.dcmpre="";//DYNAMIC CAMPAIGN RESPONSE EXPIRATION
hbx.hra="";//RESPONSE ATTRIBUTE
hbx.hqsr="";//RESPONSE ATTRIBUTE IN REFERRAL QUERY
hbx.hqsp="";//RESPONSE ATTRIBUTE IN QUERY
hbx.hlt="";//LEAD TRACKING
hbx.hla="";//LEAD ATTRIBUTE
hbx.gp="";//CAMPAIGN GOAL
hbx.gpn="";//CAMPAIGN GOAL IN QUERY
hbx.hcn="";//CONVERSION ATTRIBUTE
hbx.hcv="";//CONVERSION VALUE
hbx.cp="null";//LEGACY CAMPAIGN
hbx.cpd="";//CAMPAIGN DOMAIN
//CUSTOM VARIABLES
hbx.ci="";
hbx.hc1="";
hbx.hc2="";
hbx.hc3="";
hbx.hc4="";
hbx.hrf="";//CUSTOM REFERRER
hbx.pec="";//ERROR CODES
//INSERT CUSTOM EVENTS
//END EDITABLE SECTION
//REQUIRED SECTION. CHANGE "YOURSERVER" TO VALID LOCATION ON
YOUR WEB SERVER (HTTPS IF FROM SECURE SERVER)
</script><script language="javascript1.1"
src="http://www.examplewebsite.com/hbx.js"></script>
```

Below is an example of a WebSideStory JavaScript web page tag with test campaign data inserted:

```
<script language="javascript">
var __hbEC=0,__hbE=new Array;function __hbEvent(a,b){b=__hbE[__hbEC++]=new
Object( );b.__N=a;b.__C=0;return b;}
var hbx=__hbEvent("pv");hbx.vpc="HBX0200u";hbx.gn="ehg-
examplewebsite.hitbox.com";
//BEGIN EDITABLE SECTION
//CONFIGURATION VARIABLES
hbx.acct="WATTS000EJH00000";//ACCOUNT NUMBER(S)
hbx.pn="PUT+PAGE+NAME+HERE";//PAGE NAME(S)
hbx.mlc="CONTENT+CATEGORY";//MULTI-LEVEL CONTENT CATEGORY
hbx.pndef="title";//DEFAULT PAGE NAME
hbx.ctdef="full";//DEFAULT CONTENT CATEGORY
//OPTIONAL PAGE VARIABLES
//ACTION SETTINGS
hbx.fv="";//FORM VALIDATION MINIMUM ELEMENTS OR SUBMIT FUNCTION
NAME
hbx.lt="none";//LINK TRACKING
hbx.dlf="n";//DOWNLOAD FILTER
```

-continued

```
hbx.dft="n";//DOWNLOAD FILE NAMING
hbx.elf="n";//EXIT LINK FILTER
//SEGMENTS AND FUNNELS
hbx.seg="";//VISITOR SEGMENTATION
hbx.fnl="";//FUNNELS
//CAMPAIGNS
hbx.cmp="";//CAMPAIGN ID
hbx.cmpn="";//CAMPAIGN ID IN QUERY
hbx.dcmp="";//DYNAMIC CAMPAIGN ID
hbx.dcmpn="";//DYNAMIC CAMPAIGN ID IN QUERY
hbx.dcmpe="";//DYNAMIC CAMPAIGN EXPIRATION
hbx.dcmpre="";//DYNAMIC CAMPAIGN RESPONSE EXPIRATION
hbx.hra="";//RESPONSE ATTRIBUTE
hbx.hqsr="";//RESPONSE ATTRIBUTE IN REFERRAL QUERY
hbx.hqsp="";//RESPONSE ATTRIBUTE IN QUERY
hbx.hlt="";//LEAD TRACKING
hbx.hla="";//LEAD ATTRIBUTE
hbx.gp="";//CAMPAIGN GOAL
hbx.gpn="";//CAMPAIGN GOAL IN QUERY
hbx.hcn="";//CONVERSION ATTRIBUTE
hbx.hcv="";//CONVERSION VALUE
hbx.cp="null";//LEGACY CAMPAIGN
hbx.cpd="";//CAMPAIGN DOMAIN
//CUSTOM VARIABLES
hbx.ci="12345678"; // INJECTED VALUE: customer ID
hbx.hc1="Example_Test_Campaign__Jan_1__2005"; // INJECTED VALUE: test campaign name
hbx.hc2="5678"; // INJECTED VALUE: variation group ID ("recipe ID")
hbx.hc3="Homepage_Headline|Version1,Homepage_Subhead|
Version3,Homepage_Image|Version9"; // INJECTED VALUE: list of 3 test factors & variations
hbx.hc4="";
hbx.hrf="";//CUSTOM REFERRER
hbx.pec="";//ERROR CODES
//INSERT CUSTOM EVENTS
//END EDITABLE SECTION
//REQUIRED SECTION. CHANGE "YOURSERVER" TO VALID LOCATION ON
YOUR WEB SERVER (HTTPS IF FROM SECURE SERVER)
</script><script language="javascript1.1"
src="http://www.examplewebsite.com/hbx.js"></script>
```

Other Embodiments

In another embodiment, a separate third-party reverse proxy server is used. The functions of the proxy module are performed by the third-party reverse proxy server, and the modification module is a stand-alone software product that operates in conjunction with the third-party reverse proxy server. In this embodiment the modification module accepts input from and transmits output to the reverse proxy server, and no software changes to the reverse proxy server or the target server are required.

In another embodiment, the modification module is a stand-atone software product. In this embodiment, the reverse proxy server is optional. The target server receives a request from a web browser for web content from the target website hosted at a target server; and the modification module retrieves unmodified web content from the target server, modifies the web content (including performing a search and replace operation using regular expressions), delivers the modified web content to the requesting web browser, tracks actions of the visitor, collects data for each response point selected to be measured, and reports on how content changes affect conversion rates. In this embodiment, both the Application Service Provider (ASP) model (where the modification module is hosted on the service provider's computer) or a LAN for the enterprise model (where the modification module is hosted on the client's computer) can be used. A variation of the ASP model involves implementing the modification module in a computer "appliance" that could be installed in the client's premises or in the service provider's premises.

It is to be understood that the above description is intended to be illustrative, and not restrictive. Many other embodiments will be apparent to those of skill in the art upon reviewing the above description. The scope of the invention should, therefore be determined with reference to the appended claims, along with the full scope of equivalents to which such claims are entitled.

The invention claimed is:

1. A computerized method of testing variations of website content, the method comprising:
 receiving a request at a reverse proxy server for website content located at a web server;
 said reverse proxy server retrieving requested website content from the web server, wherein the website content contains a web page tag associated with a web analytics platform;
 modifying said website content, at the reverse proxy server, by introducing variations in the website content that is visible to a website user;
 inserting values associated with website content variations into the web page tag, whereby data from website content variations is accessible within a reporting system of a web analytics platform; and
 transmitting modified website content to a requestor;
 wherein the visible website content variations are introduced to a subset of all website users.

2. The method of claim 1, wherein the web page tag associated with the web analytics platform uses JavaScript.

3. The method of claim 1, wherein the web analytics platform is a third party platform.

4. The method of claim 1, wherein modifying said web content includes introducing multiple variations into a single web page.

5. A computerized method of testing variations of website content, the method comprising:
- receiving a request at a reverse proxy server for website content located at a web server;
- said reverse proxy server retrieving requested website content from the web server; modifying said website content at the reverse proxy server by introducing variations in the website content that is visible to a website user;
- inserting a web page tag in the modified website content, wherein the web page tag is formatted for use with a web analytics platform;
- inserting values associated with website content variations into the web page tag, whereby data from website content variations is accessible within a reporting system of the web analytics platform; and
- transmitting modified website content to a requestor;
- wherein the visible website content variations are introduced to a subset of all website users.

6. The method of claim 5, wherein the web page tag associated with the web analytics platform uses JavaScript.

7. The method of claim 5, wherein the web analytics platform is a third party platform.

8. The method of claim 5, wherein website content is static or dynamic.

9. The method of claim 5, further comprising providing a visual editor for varying website content.

10. A computerized method of testing variations of website content, the method comprising:
- receiving a request at a reverse proxy server for website content located at a web server;
- said reverse proxy server retrieving requested website content from the web server, wherein the website content contains a web page tag formatted for use with a first web analytics platform;
- modifying said website content at the reverse proxy server by introducing variations in the website content that is visible to a website user;
- modifying web page tagging within the requested website content, wherein modified web page tagging is formatted for use with a second web analytics platform;
- inserting values associated with website content variations into the web page tag, whereby data from website content variations is accessible within a reporting system of the second web analytics platform; and
- transmitting modified website content to a requestor;
- wherein the visible website content variations are introduced to a subset of all website users.

11. The method of claim 10, wherein modifying the web page tagging includes replacing an existing web page tag.

12. The method of claim 10, wherein modifying the web page tagging includes appending a second web page tag.

13. The method of claim 10, wherein the web page tag associated with the web analytics platform uses JavaScript.

14. A system for testing variations of website content, the system comprising:
- a reverse proxy server operable to:
- receive a request for website content located at a web server;
- retrieve requested website content from the web server;
- modify said website content by introducing variations in the website content that is visible to a website user;
- insert values associated with website content variations into web page tagging within the website content, whereby data from website content variations is accessible within a reporting system of a web analytics platform; and
- transmit modified website content to a requestor;
- wherein the visible website content variations are introduced to a subset of all website users.

15. The system of claim 14, wherein the web page tagging includes web page tags integrated with the website content located at the web server.

16. The system of claim 14, wherein the reverse proxy server is further operable to insert a web page tag into modified website content.

17. The system of claim 14, wherein the reverse proxy server is further operable to replace, within the website content, a first existing web page tag that is associated with a first web analytics platform, with a second web page tag that is associated with a second web analytics platform.

18. The system of claim 14, wherein the reverse proxy server is further operable to append, within the website content, a second web page tag that is associated with a second web analytics platform, to website content containing an existing web page tag that is associated with a first web analytics platform.

19. The system of claim 14, wherein the web page tagging uses JavaScript.

* * * * *